Figure 1:
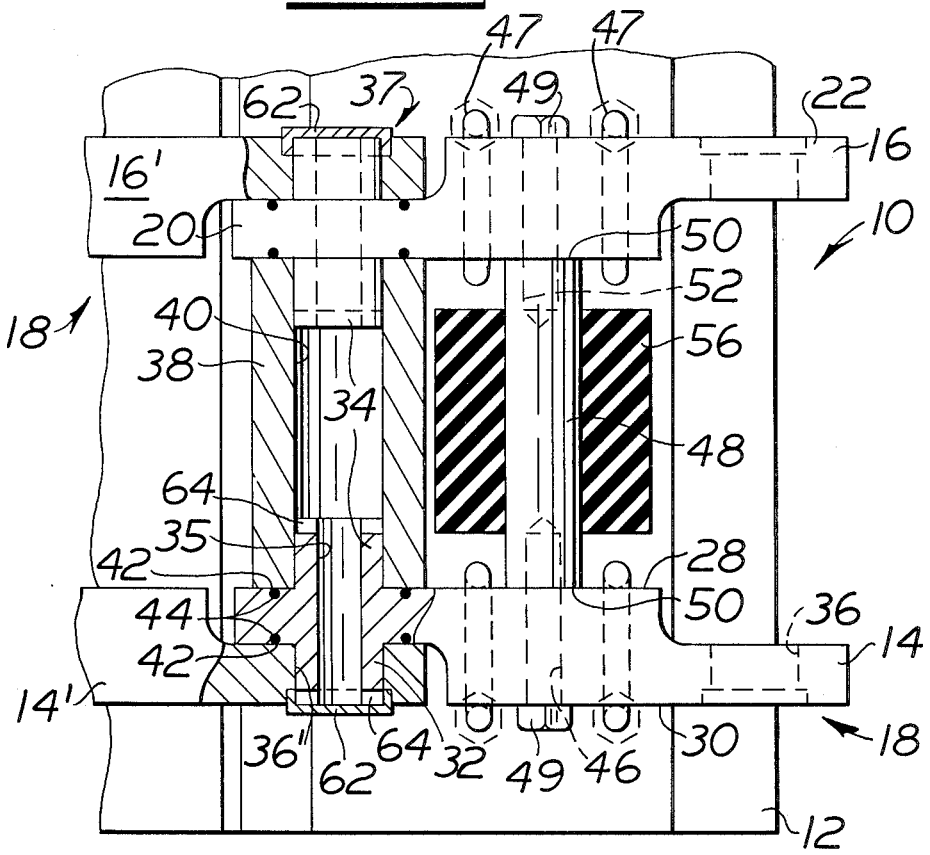
Figure 2:
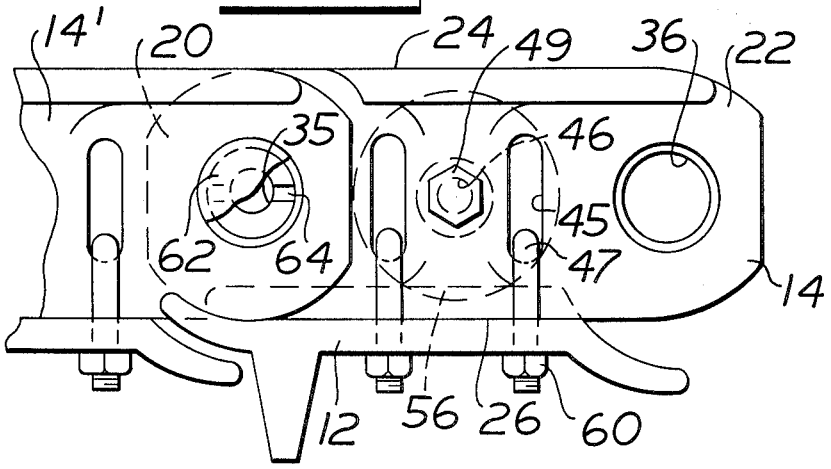

United States Defensive Publication [19] (H) [11] T978,007

Livesay [43] Jan. 2, 1979

[54] TRACK LINK- T-SHAPED

[76] Inventor: Richard E. Livesay, 1011 W. Deerbrook Dr., Peoria, Ill. 61614

[21] Appl. No.: 904,086

[22] Filed: May 8, 1978

[51] Int. Cl.[2] ..... B62D 55/20

[52] U.S. Cl. ..... 305/39

[57] ABSTRACT

Heavy duty crawler vehicles are supported and controlled by endless track chains located on opposite sides of the vehicle. Such chains consist of a plurality of track shoes attached to pairs of spaced coacting links that are interconnected by hinge pins and bushings. These pins and bushings pressed tightly into alternate but associated link ends require special tooling for initial assembly which tends to create additional problems with track disassembly and service. By using coacting track links with symmetrical inner and outer bosses at one end, sealed and lubricated laterally extending drive bushings and associated links with outwardly coupled bores are readily disassembled and serviced by detaching a central retaining member.

1 Claim, 1 Sheet Drawing,

6 Pages Specification

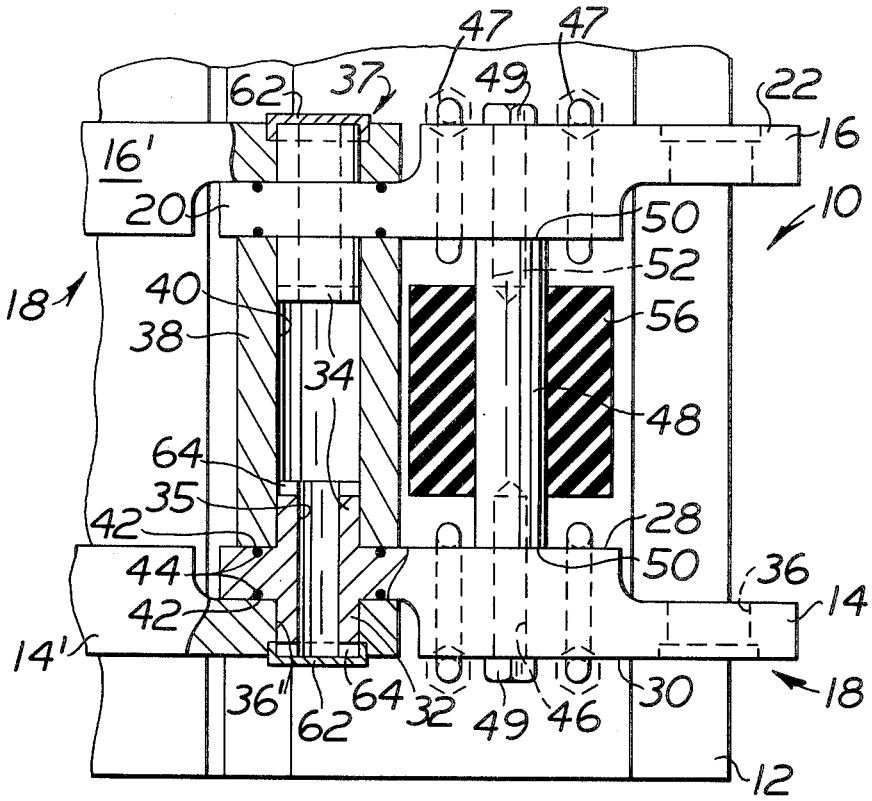

The file of this unexamined application may be inspected and copies thereof may be purchased (849 O.G. 1221, Apr. 9, 1968).